Figure 1:
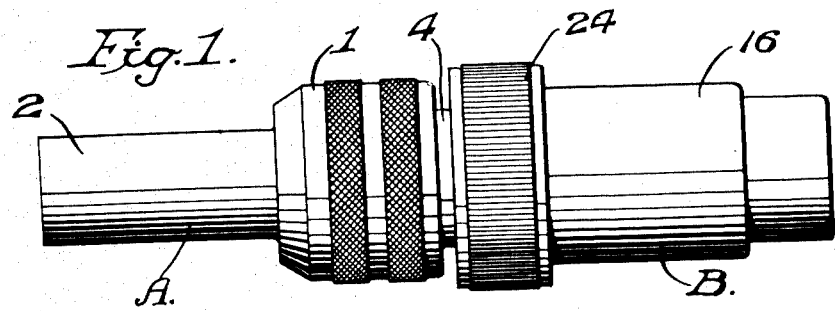

Dec. 6, 1938.  H. M. ROBINSON  2,138,940
COUPLING
Filed April 23, 1936

INVENTOR.
Herbert M. Robinson
BY
ATTORNEY.

Patented Dec. 6, 1938

2,138,940

UNITED STATES PATENT OFFICE 2,138,940

COUPLING

Herbert M. Robinson, Philadelphia, Pa., assignor to Reliable Machine Screw Sales Co., Inc., Newark, N. J., a corporation of New Jersey Application April 23, 1936, Serial No. 75,947

3 Claims. (Cl. 284—19)

My invention is an improved hose coupling particularly suitable for use in connecting the vacuum brake lines between a tractor and trailer.

Leading objects of my invention are the provision of coupling sections which can be securely locked together without danger of disengagement by vibration, jolting or the like; to provide an uncoupled male coupling member with automatic means for preventing ingress of air into the vacuum line with which such coupler member is connected; to provide means within the female member of the coupler and beyond the plane of the locking means for automatically establishing communication between the coupler members when the male member of the coupler has been moved to predetermined position in the female member of the coupler so that the members are telescoped together for an extended distance axially, thereby providing room within the female coupler member for sealing means for the male coupler member; and to provide means which may be housed within the female coupler member for sealing the joint between the coupler members at a plurality of points and to seal the joint between the male coupler member and a tube axially slidable therein to control the flow of air therethrough.

In accordance with my invention, one of the coupler members is preferably formed of a plurality of hollow stems which are coupled together by means of a cup-like shell fixed to one of the stems and a head fixed to the other of the stems and threaded into the shell and held in place by a circumferential lip on such shell. A hollow tube is slidable axially through one of the stems and has, within the shell, a head forming a valve which is biased toward closed position by a spring. Peripheral apertures in the slidable tube adjacent to its head permit communication between the interiors of the shell and tube when the latter is in retracted position; which communication is, however, shut off when the valve is biased by the spring to closed position.

The sliding tube projects at all times forwardly beyond the forward end of the stem and is provided with a bead adapted to engage a gasket encircling the tube and press such gasket against the end of the stem so as to prevent leakage between the outer surface of the tube and the inner surface of the stem.

The stem is also provided with a circumferential groove adjacent to its head and adapted for the reception of detents carried by a female coupler member, the detents being preferably movable into and locked in engaging position in the groove by the rotation of a sleeve on the female coupler. In the coupled relation of the members the stem and tube project a considerable distance into the female coupler member beyond the points of engagement of the detents, and a tight joint is made between the tube and the female coupler member and between the tube head and the end of the stem by the thrust of the forward end of the tube, and preferably also of the bead thereon, against resilient packing seated in the female member.

The detents preferably consist of fulcrumed rods which are normally biased outward away from the stem, but which may be locked in the groove of the stem by the engagement with the rods of studs rotatable by a sleeve on the female coupler.

The characteristic features and advantages of my improvements will further appear from the following description and the accompanying drawing in illustration of the preferred embodiment thereof.

Figure 2:
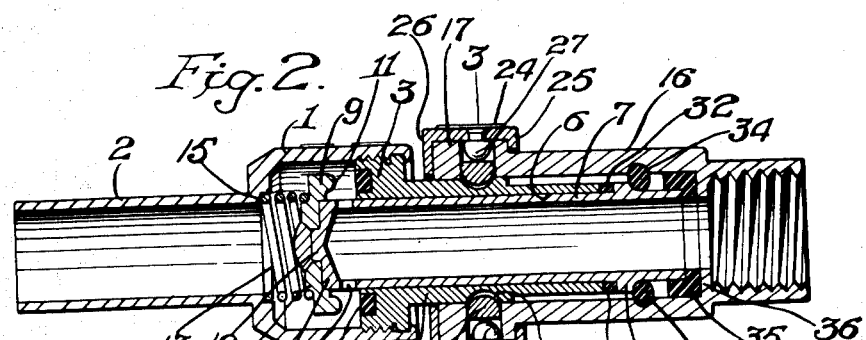
Figure 3:
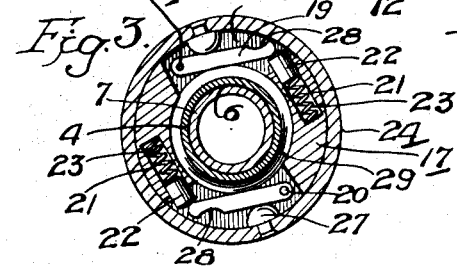
Figure 5:
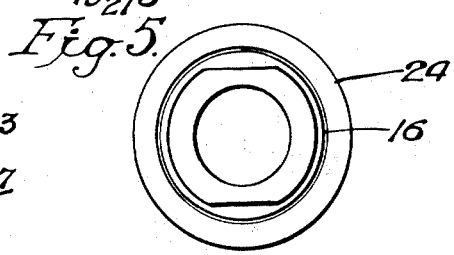
Figure 4:
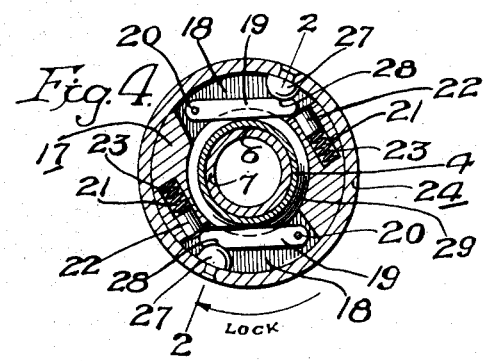

In the drawing, Fig. 1 is a side elevation of a preferred embodiment of my improved coupler; Fig. 2 is a longitudinal sectional view of the coupling shown in Fig. 1 taken on the line 2—2 of Fig. 4; Fig. 3 is a transverse sectional view taken along the line 3—3 of Fig. 2 with the parts moved to unlocked relation; Fig. 4 is a transverse sectional view taken on the same line as Fig. 3 but with parts in locking position; and Fig. 5 is an end view of the coupling taken from the right hand end thereof.

In the embodiment of my invention illustrated in the drawing, my improved coupler comprises a pair of telescopic members A and B adapted for attachment respectively to the ends of sections of hose or pipe.

In the preferred embodiment of my invention, the member A consists of a shell having a cup-like section 1, a stem 2 and a head 3 threaded into the mouth of the cup 1 and held therein by the spun over edge of the cup. The head 3 has a hollow stem or male member 4 projecting oppositely to the stem 2, and is preferably grooved on its inner surface for the reception of an elastic gasket 5. The head 3 and stem 4 contain a cylindrical bore 6 forming a slideway for a hollow tube 7, which has an integral head 8 within the cup 1. A valve 9 is fixed to the head 8 by an upset stud 10 integral with the head and passing through an aperture in the valve. The valve preferably is provided with a peripheral bead 11 adapted to be seated on the yielding gasket 5. Ports 12 are formed in the tube adjacent to the head 8 to permit communication between the interiors of the tube 7 and of the cup 1 when the valve 9 is retracted from its seat. The valve 9 is normally biased toward the gasket 5, so that the ports 12 are within the slideway 6, by means of a spring 13 having one end encircling the boss 14 on the valve and its other end bearing against the surface of the recess 15 in the cup 1.

The member B preferably consists of a hollow cylindrical shell 16 having a flanged head 17 containing recesses 18. Detents 19 in the recesses 18 are fulcrumed on pivots 20, secured to the flange 17, and are movable on these pivots toward and from the longitudinal axis of the shell 16 and in a plane normal to such axis. The flange 17 contains tangential recesses 21 for plungers 22 which are normally biased outward by springs 23 against the free ends of the pivoted detents 19 so as to rock such detents away from the axis of the shell 16 and tube 4.

A sleeve 24 is rotatable on the flange 17 and secured in place thereon by inturned flanges 25 and 26. The inner peripheral wall of the sleeve 24 has studs or buttons 27 riveted thereto which are movable circumferentially in the recesses 18 in engagement with the edges of the detents 19.

The edge of each detent 19 contains a seat 28 having a curved surface whose curvature is subtended by a chord forming an acute angle with a radius of the sleeve 24 when the detents 19 are positioned by the rotation of the buttons 27 to permit the seating of the latter in the seats 28. This prevents the accidental displacement of the buttons from the seats when the sleeve 24 is turned to locking position.

The detents 19 are adapted for engagement in the annular groove 29 of the stem 4, when the stem is telescoped to a predetermined position in the shell 16.

The tube 7 has a bead 30 thereon forming a bearing surface complementary to the bearing surface 31 on the end of the stem 4. A compressible gasket 32 encircles the tube 7 between the bearing surfaces 30 and 31 and is compressed by such surfaces when they are brought into close juxtaposition. The bead 30 is also adapted for engagement with a gasket 33, seated in an annular recess 34 in the inner surface of the shell 16, and the end of the tube 7 is adapted for engagement with an L-shaped gasket 35 seated in the end 36 of the shell 16.

It will be understood that, in use, the stem 2 will be inserted in a flexible hose line of a vacuum brake system of a tractor, and the member 16 will have its threaded end screwed onto the end of a brake tube carried by a trailer. When the element A is separated from the element B, the spring 13 will bias the valve 9 and tube 7 outwardly against suction of the vacuum in the brake system, and ingress of air into the tractor brake system will thereby be prevented.

When the brake systems of the tractor and trailer are to be connected, the stem 4 and tube 7 are pressed into the shell 16 until the detents 19 are in registration with the groove 29, whereupon the sleeve 24 is rotated in a clockwise direction until the studs 27 are engaged in the seats 28. The inward movement of the stem 4 and the engagement of the front end and bead 30 of the tube 7 with the packing in the shell 16 causes the axial movement of the tube 7 toward the left against the biasing action of the spring 13, with consequent unseating of the valve 9 and the displacement of the ports 12 beyond the slideway 6 and sealing of the joints between the tube 7 and stem 4 and between the tube 7 and cylinder 16.

Preferably the area of the opening through the tube 4 is substantially equal to the combined areas of the ports 12.

Having described my invention I claim—

1. A coupling member adapted for telescopic co-action with a complementary member and comprising a hollow shell, fulcrumed detents mounted in said shell and movable toward and from the axis thereof, means normally biasing said detents away from the axis of said shell and means comprising a rotatable sleeve on said shell for moving said detents toward the axis of said shell by the rotation of said sleeve.

2. A coupling comprising a pair of telescopic members, means for holding said members in pre-determined telescopic relation, a tube slidable axially in one of said members and having an annular rib adjacent to one end thereof, means including a valve on the end of said tube opposite to said rib for biasing said tube in one direction, and means in the other of said members for resisting the biasing action of said biasing means on said tube and including a yielding seat for the first end of said tube and a yielding seat for said rib.

3. A coupling comprising a cup-like housing, a stem having a head engaged in said housing, a tube axially slidable through said stem and head into said housing, said stem having a locking groove therein, a shell having detents adapted for engagement in said groove when the shell and stem are in operatively telescoped relation, said tube projecting beyond said detents into engagement with a seat in said shell, and a gasket sealing the joint between said tube and stem within said shell.

HERBERT M. ROBINSON.